United States Patent
Swinhoe et al.

[15] 3,693,959
[45] Sept. 26, 1972

[54] COLD TRAPS FOR LIQUID METAL

[72] Inventors: Ronald Swinhoe, Knutsford; Allan Norman Hamer, Culcheth, both of England

[73] Assignee: United Kingdom Atomic Energy Authority, London, England

[22] Filed: Dec. 9, 1970

[21] Appl. No.: 96,436

[30] Foreign Application Priority Data

Dec. 18, 1969 Great Britain..........61,826/69

[52] U.S. Cl. ........................266/37, 210/69, 210/71, 210/183, 210/184, 210/265, 210/85
[51] Int. Cl. .............................................C22b 9/02
[58] Field of Search .........266/22, 37; 75/66; 210/69, 210/71, 182, 183, 184, 265, 85

[56] References Cited

UNITED STATES PATENTS

| | | |
|---|---|---|
| 2,815,277 | 12/1957 | Bruggeman et al............75/66 |
| 2,879,157 | 3/1959 | Batutis et al....................75/66 |
| 2,969,970 | 1/1961 | Shomer.......................266/37 |
| 3,554,374 | 1/1971 | Blair............................210/85 |
| 3,618,770 | 11/1971 | Pohl et al...............210/184 X |

*Primary Examiner*—R. Spencer Annear
*Attorney*—Larson, Taylor and Hinds

[57] ABSTRACT

A cold trap for liquid metal comprises a vessel, a cylindrical duct member being arranged concentrically in the vessel. Flow of liquid metal from inlet into the vessel is downwardly along the annular interspace defined between the duct member and the inner wall of the vessel and then into the lower end of the vessel and upwardly through the duct member. The upper length of the duct member from the liquid metal inlet and of the vessel is of a thermally conducting nature, while the remaining length of the duct member towards the lower end of the vessel is of double walled construction so as to be of a thermally insulating nature.

2 Claims, 1 Drawing Figure

PATENTED SEP 26 1972  3,693,959
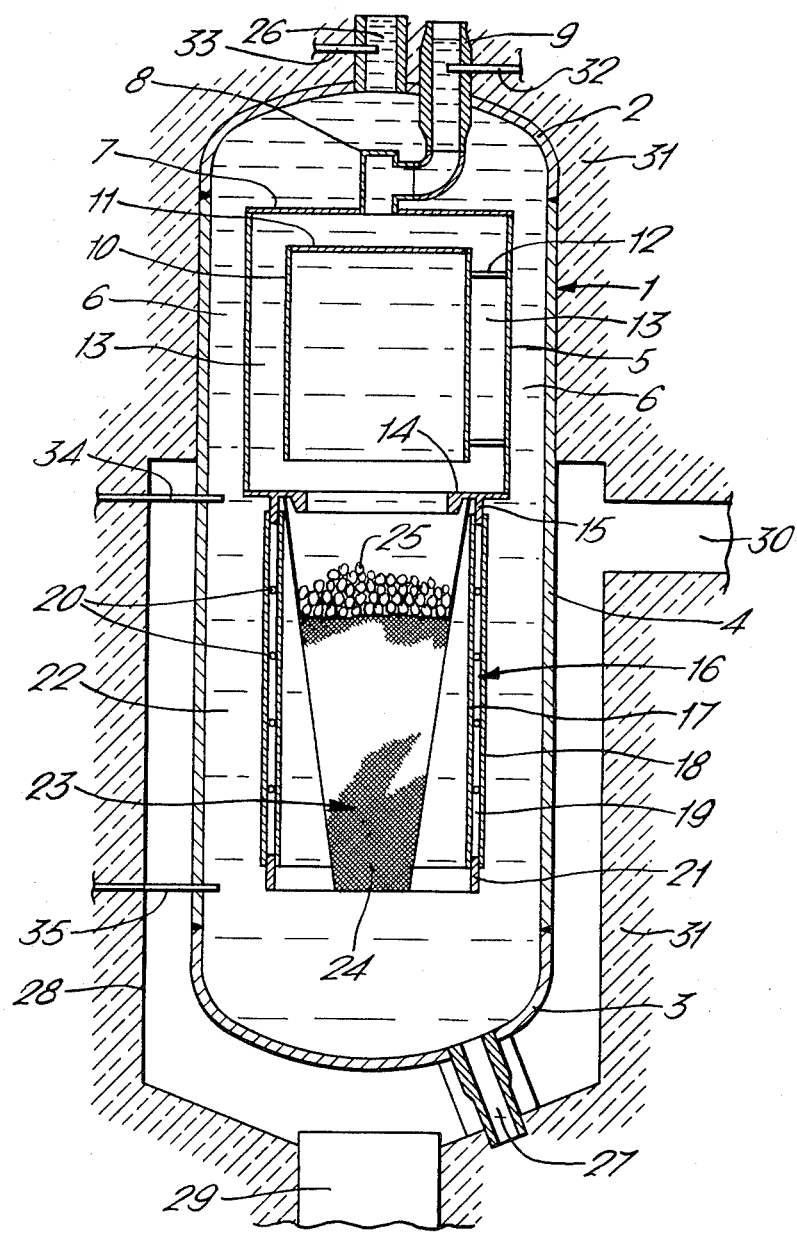

COLD TRAPS FOR LIQUID METAL

BACKGROUND OF THE INVENTION

This invention relates to cold traps for use in liquid metal circuits. Liquid metal such as, for example, sodium, circulating as heat exchange medium is subject to the formation of impurities in the form of oxides, hydrides, metallic compounds and metallic and carbon particles. Cold traps are sometimes included in the circuits to reduce the temperature of the metal to below the impurity saturation temperature so that soluble impurities such as oxides are precipitated. The traps may have filter elements to retain the precipitated solids and insoluble particles and may also have a sump for the collection of sediment. Known cold traps are subject to blockage early in life due to build up of precipitates on the cooler surfaces of the trap and even though allowance is made for this phenomenon by providing traps of capacity several times greater than would normally be required, long service without attention cannot be expected. Cold traps normally have regenerative heat exchange means wherein the flow of liquid metal is directed in two opposed flow paths by a barrier forming a common boundary between the two flow paths. External cooling means are provided for cooling the liquid metal in passage through the first flow path from inlet temperature to a temperature below the impurity saturation temperature of the liquid metal so that soluble impurities are precipitated from the liquid metal mainly in the first flow path. From the first flow path the liquid metal passes along the second flow path and is partially reheated by heat transfer from the liquid metal in the first flow path through the barrier forming the common boundary between the two flow paths.

As a substantial longitudinal temperature gradient exists in the liquid metal passing along the first flow path precipitation of solid impurities from the liquid metal will be limited to a localized region towards the end of the first flow path where the temperature of the liquid metal is at or below the impurity saturation temperature of the liquid metal. One of the modes of precipitation of impurities is by deposition on the walls of the passageway defining the first flow path. Deposition of impurities by this mode in the localized region of the flow path in which precipitation can occur soon leads to blocking of the flow path by localized build up of impurities.

DESCRIPTION OF THE INVENTION

According to the present invention a cold trap for purifying liquid metal comprises means for directing the flow of liquid metal along a first flow path and in return along a second flow path, the first and second flow paths being separated by a barrier forming a common boundary between the two flow paths, external cooling means being provided for cooling the liquid metal in passage through the latter part of the first flow path, the barrier being of a thermally insulating nature in its length separating the latter part of the first flow path and the initial part of the second flow path and the barrier being of a thermally conducting nature in its length separating the initial part of the first flow path and the latter part of the second flow path.

A preferred form of cold trap according to the invention comprises a vessel a cylindrical duct member arranged concentrically in the vessel whereby an annular interspace is defined between the duct member and the inner wall of the vessel, means for feeding liquid metal into one end of the vessel, means directing the flow of liquid metal in a first flow path along the annular interspace defined between the duct member and the inner wall of the vessel and then in a second flow path through the duct member, part of the duct member from the liquid metal inlet end of the vessel being of a thermally conducting nature, the remaining length of the duct member towards the other end of the vessel being of a thermally insulating nature and means being provided for externally cooling the vessel at least in the region corresponding to the length of the duct member which is of a thermally insulating nature.

The length of the duct member which is of a thermally insulating nature may be of double walled construction comprising inner and outer walls defining an evacuated or gas filled interspace there between.

DESCRIPTION OF THE DRAWING

One embodiment of the invention will now be described by way of example with reference to the sole FIGURE of the accompanying drawing which is a semi-schematic longitudinal sectional elevation.

DESCRIPTION OF THE PREFERRED EMBODIMENT

The cold trap shown in the drawing comprises a cylindrical stainless steel vessel 1 having domed upper and lower ends 2 and 3. The domed upper and lower ends 2 and 3 of the vessel 1 are formed separately from and are welded to the main cylindrical body 4 of the vessel 1.

A cylindrical stainless steel duct member 5 is located concentrically in the upper end of the vessel 1, an annular passageway 6 being defined between the duct member 5 and the vessel 1. The upper end of the duct member 5 is closed by a welded end plate 7 having a stub branch pipe 8 which is connected with a sodium outlet branch pipe 9 welded in in penetration through the domed upper end 2 of the vessel 1.

A cylindrical stainless steel baffle 10, having its upper end closed by a welded end plate 11, is located within the duct member 5. The baffle 10 is supported concentrically within the duct member 5 by radial legs 12 so that an internal annular passageway 13 is defined between the baffle 10 and the duct member 5.

An annular end plate 14 is welded to the lower end of the duct member 5. The end plate 14 has an integral cylindrical flange 15 from which there is suspended a cylindrical duct assembly 16 arranged concentrically within the lower part of the vessel 1.

The duct assembly 16 is double walled comprising inner and outer cylindrical wall members 17 and 18. The wall members 17 and 18 are of stainless steel and the inner wall member 17 is of smaller external diameter than the internal diameter of the outer wall member 18 so that an annular interspace 19 is defined between the wall members 17 and 18. Tubular rings 20 spacing the wall members 17 and 18 apart are provided at intervals along the length of the interspace 19. At its lower end the interspace 19 is sealed by a cylindrical ring 21 fitting between and welded to the lower ends of the wall members 17 and 18 of the duct assembly 16. The cylindrical flange 15 on the annular end plate 14 of the duct member 5 fits between and is welded to the upper ends of the wall members 17 and 18 of the duct assembly 16. The interspace 19 between the wall members 17 and 18 of the duct assembly 16 is either evacuated or is filled with a gas such as argon. A lower annular passageway 22 is defined between the duct assembly 16 and the wall of the vessel 1.

A filter basket 23 is fitted inside the duct assembly 16. The filter basket 23 is of frustro-conical shape and comprises a skeletal stainless steel framework covered with fine wire mesh 24. The filter basket 23 contains a packing, for example of Raschig rings 25. The upper end 2 of the vessel 1 has a sodium inlet branch pipe 26 and the lower end 3 of the vessel 1 has an outlet branch pipe 27. The lower end of the vessel 1 is surrounded by a jacket 28 having a bottom inlet duct 29 and a radial outlet duct 30 at its upper end. A layer of thermal insulation 31 covers the jacket 28 and the vessel 1 above the jacket 28.

Thermocouples 32 and 33 are fitted respectively in the sodium outlet branch pipe 9 and the sodium inlet branch pipe 26 of the upper end 2 of the vessel 1. A thermocouple 34 is provided extending radially through the wall of the vessel 1 in the region of the upper end of the duct assembly 16. A further thermocouple 35 is provided extending radially through the wall of the vessel 1 in the region of the lower end of the duct assembly 16.

In use of the cold trap described above hot sodium, for example at 350° C is passed into the vessel 1 through the sodium inlet branch 26 at the upper end of the vessel 1. The hot sodium passes downwards through the annular passageway 6 which is defined between the duct member 5 and the upper part of the vessel 1. From the annular passageway 6 the sodium then continues downwards through the lower annular passageway 22 which is defined between the duct assembly 16 and the lower part of the vessel 1. The arrangement is such that when the sodium enters the region of the upper end of the annular passageway 22 its temperature, as determined by the thermocouple 34, has been reduced, for example, to 170° C which is slightly above the impurity saturation temperature at which solid impurities, such as sodium oxide, precipitate out from the sodium.

Further cooling of the sodium as it passes down the lower annular passageway 27 is by forced circulation of air through the jacket 28 surrounding the lower end of the vessel 1. Air is passed into the jacket 28 through the bottom inlet duct 29 and is extracted through the radial outlet duct 30. The rate of air circulation through the jacket 28 is controlled so that when the sodium reaches the lower end of the annular passageway 22 its temperature has been reduced, for example, to 150° C which is slightly below the impurity saturation temperature at which solid impurities precipitate out from the sodium. Thus there is only a small temperature gradient in the sodium along the length of the passageway 22. Therefore although the temperature range within which solid impurities will precipitate out from the sodium is limited the sodium within a major part of the length of the passageway 22 will be at a temperature within this range. This feature of the cold trap of the invention presents two advantages over previous forms of cold trap.

In previous forms of cold trap the sodium is cooled uniformly from entry temperature to a temperature below the saturation temperature at which solid impurities precipitate out from the sodium. Thus a large temperature gradient exists along the flow path of the sodium about the point where the temperature of the sodium has been reduced to the impurity saturation temperature. This means that because precipitation of solid impurities from the sodium only occurs over a limited range of temperature below the impurity saturation temperature such precipitation will only be achieved in a localized region of the sodium flow path.

Precipitation of solid impurities from the sodium occurs, in one way, by deposition of the precipitate on the walls of the passageway through which the sodium is passed whilst being cooled. Because in previous forms of cold trap precipitation occurs in only a localized region of the path there will be a localized build up of precipitates on the walls of the passageway which leads to rapid blocking of the passageway by deposited precipitates.

In the form of cold trap in accordance with the present invention some precipitation of solid impurities from the sodium will likewise occur by deposition on the surfaces of the passageway 22, that is on the inner wall of the vessel 1 and on the outer wall member 18 of the duct assembly 16. As the sodium in the major part of the length of the passageway 22 is at a temperature within the range wherein precipitation of solid impurities will occur precipitation by this mechanism will be spread over the majority of the length of the passageway 22 which reduces the tendency for the passageway 22 to become blocked by the deposition of solid impurities on its surface.

In another mechanism precipitation of solid impurities occurs by the formation of small particles within the bulk of the sodium. In previous forms of cold trap because precipitation only occurs in a localized region of the sodium flow path this presents a physical limitation on the rate at which solid impurities can precipitate from the sodium by this mechanism. In the cold trap of the present invention because precipitation occurs over the majority of the length of the passageway 22 there is an increased volume of sodium in which precipitation can occur by the formation of solid particles within the bulk of the sodium and therefore the rate of precipitation of impurities by this mechanism is increased.

The solid particles of impurity which precipitate in the bulk of the sodium mainly collect as a sediment in the bottom end 3 of the vessel 1 and the sodium flow rate through the vessel 1 is limited to ensure that this occurs. The sedimented material is removed periodically from the bottom end 3 of the vessel 1 through the outlet branch pipe 27. From the bottom end of the vessel 1 the sodium is passed upwards through the interior of the duct assembly 16. The filter basket 23 filters out any precipitated particles which are carried over from the bottom of the vessel 1 by the sodium passing upwards through the duct assembly 16. Because the duct assembly 16 is double walled it is of a thermally insulating character and the sodium, in passing upwards through the interior of the duct assembly 16, only rises in temperature by a small amount, for example from the temperature of 150° C at the bottom of the vessel at its point of entry into the duct assembly to a temperature of 160° C at the upper end of the duct assembly 16, where the sodium enters the lower end of the annular passageway 13 which is defined between the baffle 10 and the duct member 5. Heat is transfered through the wall of the duct member 5 from the hot sodium passing downwardly through the annular passageway 6 to the cool sodium passing upwardly through the annular passageway 13. Thus the sodium in passing downwardly through the passageway 6 is cooled from its inlet temperature of, for example, 350° C to the required temperature of for example, 170° C at the point of entry of the sodium into the upper end of the lower passageway 22. The sodium in the passageway 6 finally passes out of the duct member 5 through the branch pipe 8 and the sodium outlet branch pipe 9 in the upper end 2 of the vessel 1. At exit through the sodium outlet branch pipe 9 the sodium is at a temperature of for example 330° C.

The lower end 3 of the vessel 1 may be of demountable form selected from a range of capacities to suit the capacity of the circuit. A lower end 3 of suitable size is selected to provide for a reduced flow rate so that insoluble particles can precipitate out. The lower end 3 of the vessel 1 may also be provided with magnetic means for the attraction and retention of magnetically attractable solids.

We claim

1. A cold trap comprising a vessel, a cylindrical duct member arranged concentrically in the vessel and defining an annular interspace between the duct member and the inner wall of the vessel, means for feeding liquid metal into the vessel, means for directing the flow of liquid metal in a first flow path along the annular interspace defined between the duct member and the inner wall of the vessel and then in a second flow path through the duct member, part of the duct member from the liquid metal inlet end of the vessel being of a thermally conducting nature for permitting heat flow thereacross between the first and second flow paths on opposite sides of the said thermally conducting part of the duct member, the remaining length of the duct member towards the other end of the vessel being of a thermally insulating nature for limiting heat flow thereacross between the first and second flow paths on opposite sides of the said thermally insulating part of the duct member and means being provided for externally cooling the vessel at least in the region corresponding to the length of the duct member which is of a thermally insulating nature.

2. A cold trap as claimed in claim 2 wherein the length of the duct member which is of a thermally insulating nature is of double walled construction comprising inner and outer walls defining an evacuated or gas filled interspace therebetween.

* * * * *